(12) United States Patent
Scott et al.

(10) Patent No.: US 7,309,141 B2
(45) Date of Patent: Dec. 18, 2007

(54) AIR ACTUATED DECORATION SYSTEM AND DEVICE

(75) Inventors: Bryan Allan Scott, Austin, TX (US); Denny Pak-kei Wong, Houston, TX (US)

(73) Assignee: ResetOne, Inc., Austin, TX (US)

( * ) Notice: Subject to any disclaimer, the term of this patent is extended or adjusted under 35 U.S.C. 154(b) by 157 days.

(21) Appl. No.: 11/326,250

(22) Filed: Jan. 5, 2006

(65) Prior Publication Data

US 2007/0153537 A1    Jul. 5, 2007

(51) Int. Cl.
    *F21L 13/02* (2006.01)
(52) U.S. Cl. .............. 362/192; 219/201; 219/530; 362/193; 362/545; 362/547; 200/83 R; 200/83 Z; 200/61.22; 200/83 J
(58) Field of Classification Search ............. None
    See application file for complete search history.

(56) References Cited

U.S. PATENT DOCUMENTS

| | | | | |
|---|---|---|---|---|
| 1,344,084 A | * | 6/1920 | Hackett ................ 362/502 |
| 1,876,625 A | * | 9/1932 | Daugherty .............. 40/441 |
| 2,606,607 A | * | 8/1952 | Vita ..................... 160/27 |
| 2,726,320 A | * | 12/1955 | Damiano ............... 40/441 |
| 3,063,253 A | * | 11/1962 | Dickson et al. ........ 62/256 |
| 3,340,647 A | * | 9/1967 | Lathrop ................ 446/207 |
| 4,136,651 A | * | 1/1979 | Hattori et al. ......... 123/700 |
| 4,356,365 A | * | 10/1982 | Siiberg ................ 200/83 J |
| 5,015,918 A | * | 5/1991 | Copeland .............. 315/76 |
| 5,683,176 A | * | 11/1997 | Clendenin ............. 362/385 |
| 2004/0114385 A1 | * | 6/2004 | Ho ..................... 362/500 |
| 2006/0092621 A1 | * | 5/2006 | Lai ..................... 362/96 |
| 2007/0126293 A1 | * | 6/2007 | Wu ..................... 310/73 |

\* cited by examiner

*Primary Examiner*—Sandra O'Shea
*Assistant Examiner*—Danielle Dunn

(57) ABSTRACT

The invention is a system that provides a means to using passing air to turn on an electronically powered device that is removably attached to an exterior portion of a vehicle as the vehicle travels betweens two locations. The invention is also embodied as a device that provides a means to turn on an incandescent light bulb that illuminates an ornament that is attached to an automobile window using passing air caused a moving automobile.

19 Claims, 3 Drawing Sheets

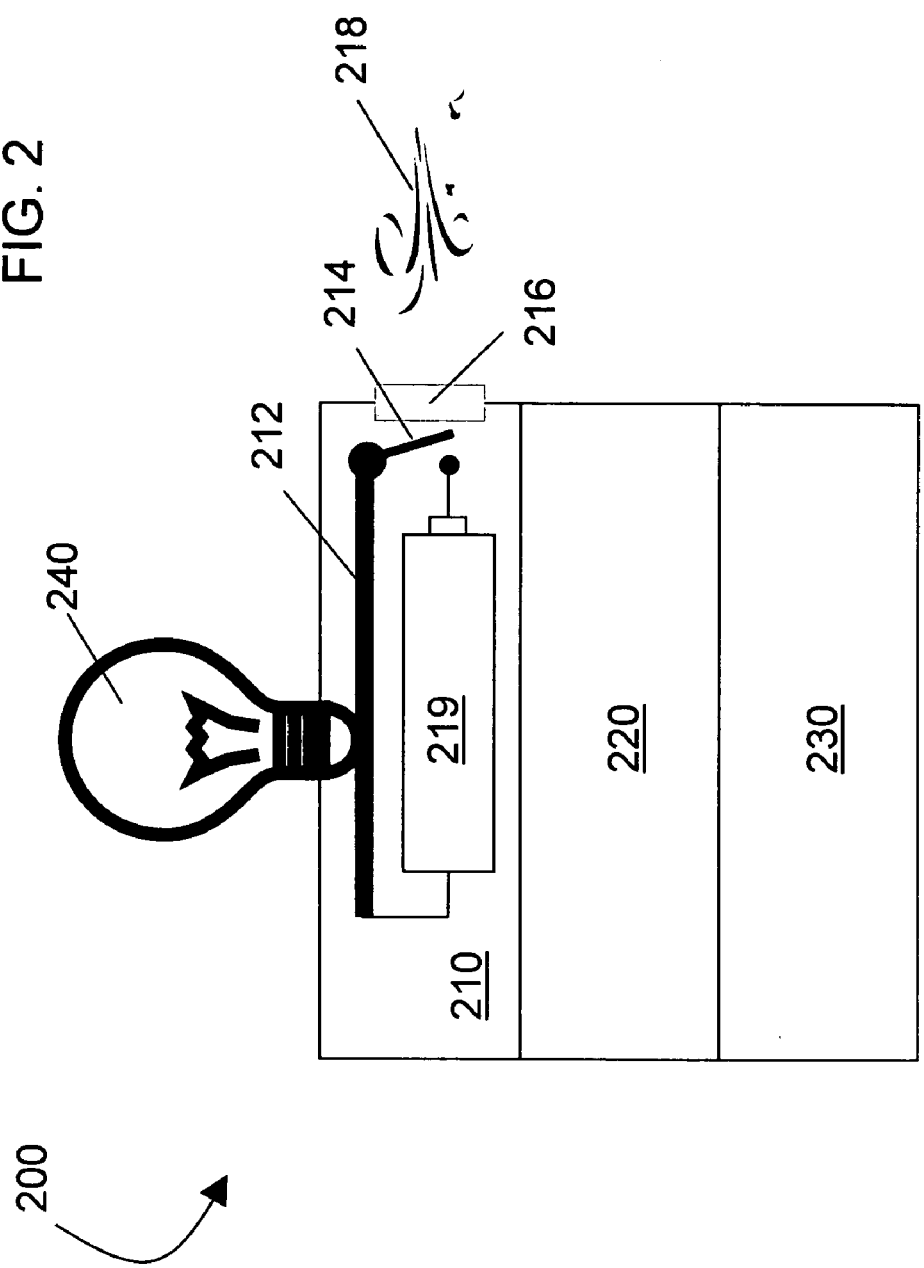

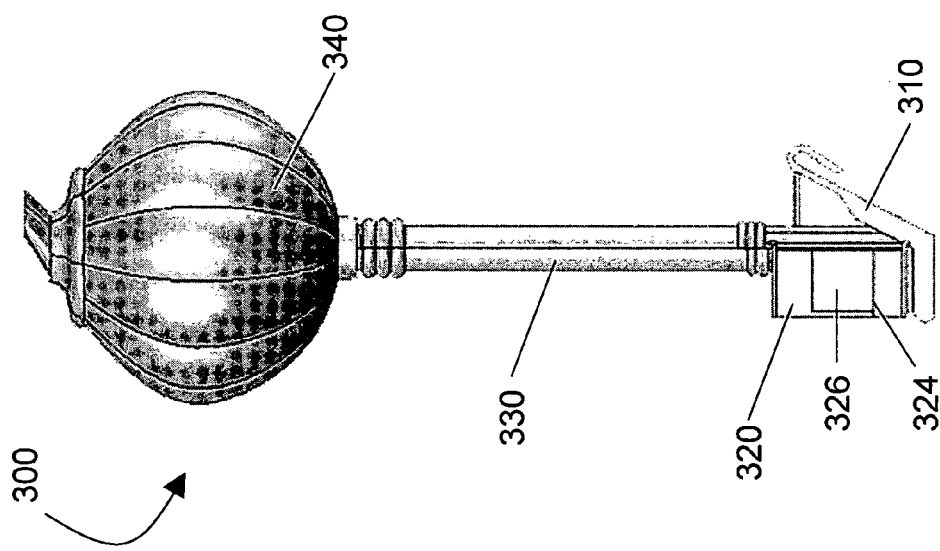

AIR ACTUATED DECORATION SYSTEM AND DEVICE

BACKGROUND OF THE INVENTION

The invention relates to decorations, and, more specifically the invention relates to air actuated vehicle decorations.

BRIEF SUMMARY OF THE INVENTION

Interpretation Considerations

This section does not describe prior art as defined for purposes of anticipation or obviousness under 35 U.S.C. section 102 or 35 U.S.C. section 103. Thus, nothing stated in the BRIEF SUMMARY OF THE INVENTION is to be construed as prior art Discussion Attaching decorations to a house, building, or vehicle for special occasions, or holidays is a common practice. This practice is widespread throughout the world and most commonly practiced in the United States. Throughout time this practice has inspired the creation of many unique decorations, some that require a portable power source, such as batteries, for example to illuminate lights, or power a microcontroller, pre-recorded message, toy motor, or switch. Unfortunately, decorations that contain a portable power source usually require a person to manually turn the decoration on at the beginning of each use and turn the decoration off after each use to preserve power. Accordingly, the requirement for a person to turn the decoration on at the beginning of each use and turn the decoration off after each use is inconvenient and commonly leads to the decoration remaining on when not in use, and ultimately a depleted power source.

This invention provides technical advantages as an air actuated decoration system and device that eliminates the need for a person to manually turn a decoration on at the beginning of each use and turn a decoration off after each use thereby reducing unnecessary depletion of the decoration's portable power source. Preferably, the air actuated decoration system and device, is attached to a portion of a vehicle, and is turned on by passing air as the vehicle is traveling between two locations and is turned off when the vehicle comes to a complete stop.

The air actuated decoration system has a switch that is activated by air passing to an external portion of a vehicle as the vehicle travels between two locations, thereby enabling a circuit to provide power to a Light Emitting Diode (L.E.D.) or other type of electronic device, such as a toy motor or pre-recorded message, for example. The air actuated decoration system may also be embodied as a device that is a wind activated decoration which attaches to a portion of an automobile window that illuminates a generally hollow ornament such as a pumpkin, as an automobile travels between two locations, for example.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWING

Various aspects of the invention, as well as at least one embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which:

FIG. 2 illustrates a system diagram of an air actuated decoration system;

FIG. 3 illustrates a side-view of a preferred embodiment of an air actuated decoration device;

AN EXEMPLARY EMBODIMENT OF A BEST MODE

Interpretation Considerations

Figure 1:
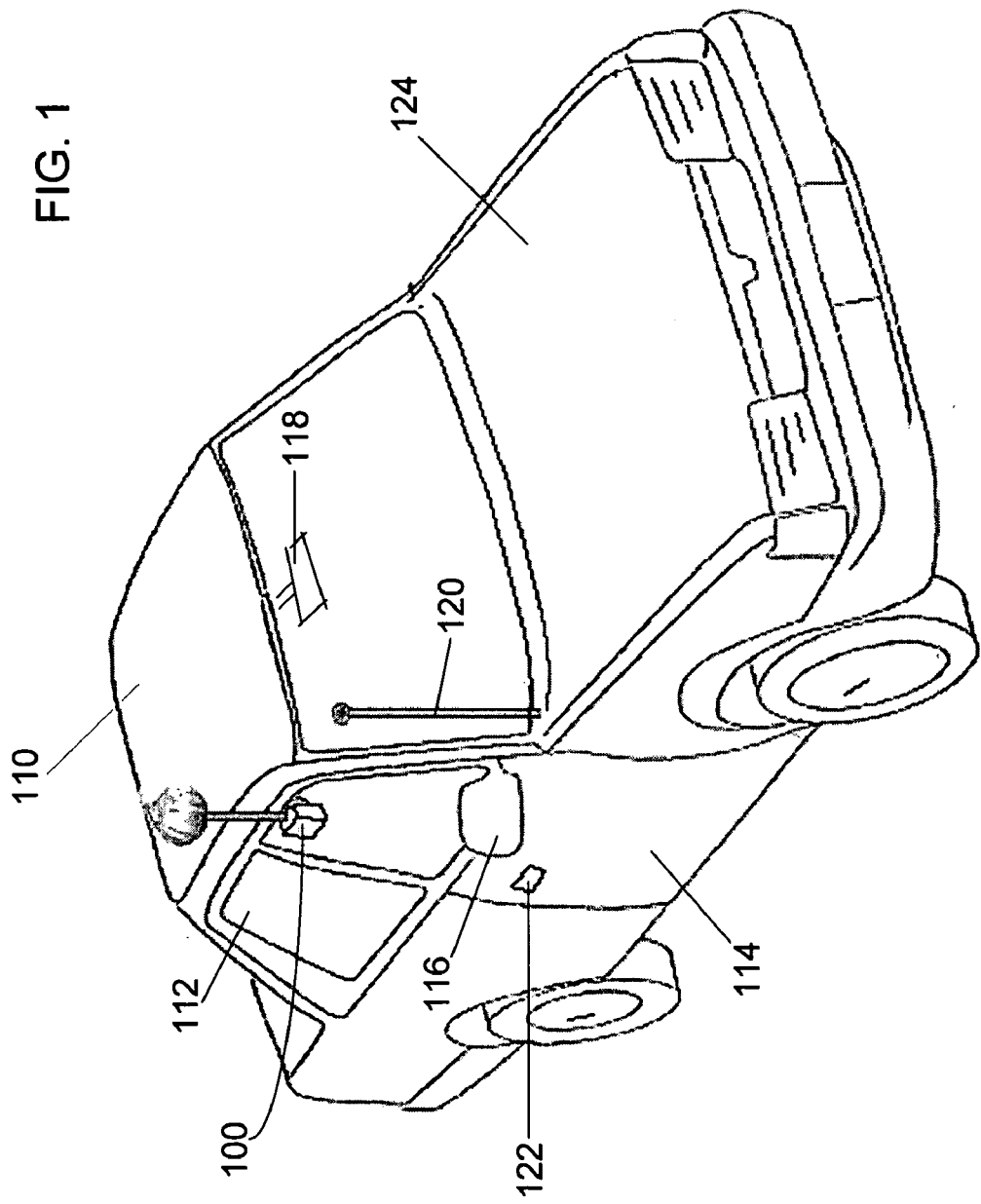
FIG. 1 illustrates an air actuated decoration system.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for —functioning—" or "step for —functioning—" in the CLAIMS section.

Discussion of the Figures

Accordingly, the invention can be characterized as an air actuated decoration system and device. In one embodiment, the invention is a system that has a switch that is activated by air passing generally near to any external portion of a vehicle as it travels between two locations, enabling a circuit to provide power to an electronic device. In another embodiment, the invention is embodied as a device that is an air actuated decoration having a switch that is activated by air passing near to an external portion of an automobile as it travels between two locations enabling a circuit to illuminate an incandescent light that is housed within an ornament, having a member, such as an arm, for example, integrally formed within a body that removably attaches to a portion of an automobile window.

Reference is now made to FIG. 1, which depicts an air actuated decoration system 100 adapted to attach to a portion of a vehicle 110 for decoration. Vehicles include any device or structure for transportation persons or things, whether personal, commercial, or embodied as a toy and include, however, are not limited to automobiles, passenger cars, sport utility vehicles, trucks, station-wagons, mini-vans, bicycles, tricycles, motorcycles, motor homes, recreational vehicles, trains, boats, or toys such as kites, airplanes, or rockets for example. A portion of a vehicle 110 may include a window 112, a door 114, a side-view mirror 116, a rear-view mirror 118, an antenna 120, a door handle 122, an air vent (not shown) that is used to direct hot and cold air within a vehicle, a hood 124, a luggage rack, a trunk, a sunroof, and a wheel, for example. In a preferred embodiment, the air actuated decoration system 100 may be fastened to a top portion of an automobile window 112 by a fastening means such as an arm, for example. In an alternative embodiment, the air actuated decoration system 100 may be fastened to a luggage rack by a fastening means such as a clamp, for example. In both embodiments, the air actuated decoration system is removably attached to an outside portion of the automobile 110 so that passing air may activate an air actuated switch within the air actuated system 100.

It should be apparent to those skilled in the art, that the air actuated decoration system 100 may be removably attached to toys such as kites, airplanes, or rockets, for example, and that the same end result of the system may be achieved by air passing generally near an external surface of the toy where the system is removably attached. In addition, it should also be apparent, that the air actuated decoration system 100, may also be integrally formed within a toy such that the same end result of passing air activating an air actuated circuit to provide power to an electronically powered device may be achieved.

FIG. 2 illustrates a system diagram of an air actuated decoration system 200. The air actuated system 200 comprises a body 210 having a air actuated circuit 212, an air actuated switch 214 electrical coupled to the air actuated circuit 212, a fastening means 220 adapted to attach a portion of the body 210 with a portion of a vehicle 230 or toy (not shown), and at least one electrically powered device 240 that is coupled to the air actuated circuit 212 whereby electricity is provided to the electrically powered device 240 from the air actuated circuit 212. In a preferred embodiment the body 210 is hollow, generally box shaped, is made out of plastic, and has at least one opening 216 on a side portion of the body 210. In addition, the air actuated switch 214 is generally positioned near to the opening 216, such that passing air 218 may activate the air actuated switch 214. It should be apparent to those skilled in the art of manufacturing that the body 210 may be made in various shapes and sizes and made of various materials such as alloy, plastic, urethane, or polyurethane for example. Furthermore, the body may be made in various colors, such as black or white, for example.

In a preferred embodiment, the air actuated switch 214 comprises a flap that travels across a gap to couple a first plate with a second plate when the force of the passing air 218 is great enough to cause the flap to bend, swing, tilt, hinge, or move such that the flap crosses the gap and couples the first plate with the second plate, closing the circuit between the first plate and the second plate. Once the circuit is closed between the first plate and the second plate, the air actuated circuit 212 is enabled, enabling power to be supplied to the electrically powered device 240. Preferably, the flap, first plate, and second plate comprises metal or a metal alloy, such as aluminum, tin, copper, steal, or other material conductive material used for making electrical wires or conducting electricity, for example. The gap preferably, is no greater than one millimeter, however, the gap may be increased or decreased based on the implementation of the invention.

Also, in a preferred embodiment the fastening means 220 is integrally formed within a portion of the body 210. In an alternative embodiment, the fastening means 220 is adapted to removably attach to the body 210. It should be apparent to those skilled in the art of manufacturing that the fastening means 220 may be a clip, clamp, bracket, double stick tape, a magnet, hook and loop tape, Velcro, or a suction cup, for example.

The electrically powered device 240 may be any device that requires electricity to function, operate, illuminate, or animate. In a preferred embodiment, the electrically powered device 240 is a lamp, such as a Light Emitting Diode (L.E.D.), fluorescent, halogen, or incandescent light, for example. The lamp may be any color in the visible spectrum, such as white, orange, red, green, blue, violet, or others for example. In an alternative embodiment, the air actuated decoration system 200 may comprise a plurality of electronically powered devices 240, such as a plurality of lamps that may be wired in series or parallel, which may all be the same color, bicolor, or multicolor, for example. In addition, the lamps may flash on and off in a pattern or increase and decrease in intensity or varying in luminosity. In yet another alternative embodiment, the electronically powered device 240 may be a combination of a toy motor, a pre-recorded message, and a lamp, for example.

The air actuated circuit 212 may be powered by a power system, such as at least one battery 219 or generator. Batteries may include alkaline, nickel metal hydride, lithium ion, or lead acid technologies, for example. Generators may include, wind powered systems that incorporate an impeller, wind turbine, or a dynamo, for example. Preferably, the power system is secured within a portion of the body 210 or fastened externally to a portion of the body 210. However, it should be apparent to those skilled in the art that the power system may also be an external non-portable power source, such as direct current supplied from a cigarette lighter and transported via a wire or series of wires to the air actuated circuit 212, for example.

FIG. 3 illustrates a side-view of a preferred embodiment of an air actuated decoration device 300. The air actuated decoration device 300 removably attaches to a top portion of a vehicle window via a fastening means 310 that is integrally formed within the body 320. A bottom portion of a semi-hollow flute 330 is coupled to the top portion of the body 320. The body 320 is hollow, generally box shaped, is made out of plastic, and has at least one opening 324 on a side portion of the body 320. In addition, the body 320 comprises an air actuated circuit (not shown) that is coupled to an air actuated switch 326 that is generally positioned near the opening 324, such that passing air may activate the switch 326. In addition, a photo-sensor (not shown) is coupled to the air actuated circuit, such that a lamp (not shown) may only turn on when it is dark outside and passing air is created as the vehicle is traveling between locations.

A generally hollow ornament 340 is adapted to removably attach to the top portion of the flute 330. Preferably, the ornament 340 is screwed on to the top portion of the flute 330 however it may be attached via a snap, clip, or other fastening means. The ornament 340 is made of a transparent or semi-transparent material, such as plastic, urethane, polyurethane, or other molded material, know to those skilled in the art of making plastic toys and decorations, such that the lamp may illuminate the ornament 340. The lamp is generally positioned immediately above the top most portion of the flute 330 and within the bottom most portion of the ornament 340.

The ornament 340 may be molded to any shape that represents the head of an animal, cartoon character, or object, for example. Preferably, the ornament 340 is blow molded. An animal may be a cougar, a lion, a dog, or a cat, for example. A cartoon character may be Frosty the Snowman, Rudolph the Red Nose Reindeer, Broom Hilda, Casper the friendly Ghost, or Betty Boop, for example. An object may be a flower, a football, a baseball, or a balloon, for example. In this example, the ornament 340 is a semi-transparent orange pumpkin. In addition, the air actuated decoration device 300 may have materials such as cloth, vinyl, or strings fastening to any portion of the fastening means 310, body 320, flute 330, or ornament 340 representing, ears, eyes, hair, or high school or college color streamers, for example.

In an alternative embodiment, the ornament 340 may be replaced with a flag having at least one lamp, light pipe, lens, that may illuminate, glow, strobe, flash, flicker, or pulse when the air actuated switch 326 is activated. Preferably, the flag may have a plurality of lamps oriented in a shape of a team mascot, such as a Longhorn, Coyote, or Bear, for example. In addition, the flag may have a plurality of lamps or light pipes oriented to represent starts in the United States flag. Furthermore, the flag may have a single lamp or light pipe, to represent a single star in the Texas flag, for example.

Thus, though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An air actuated decoration system for coupling with a portion of a vehicle to provide decoration comprising;
   a body having an air actuated circuit including at least one air actuated switch and at least one power system;
   at least one fastening means adapted to attach a portion of the body with a portion of a vehicle; and
   at least one electrically powered device coupled to the air actuated circuit whereby electricity is provided to the electrically powered device from the air actuated circuit.

2. The air actuated system of claim 1 wherein the vehicle is an automobile.

3. The air actuated system of claim 1 wherein the vehicle is a bicycle.

4. The air actuated system of claim 1 wherein the portion of a vehicle is a window.

5. The air actuated system of claim 1 wherein the fastening means is integrally formed within a portion of the body.

6. The air actuated system of claim 1 wherein the fastening means is removably attached to the body.

7. The air actuated system of claim 1 wherein the fastening means is an arm.

8. The air actuated system of claim 1 wherein the fastening means is a magnet.

9. The air actuated system of claim 1 wherein the fastening means is a clamp.

10. The air actuated system of claim 1 wherein the fastening means is a bracket.

11. The air actuated system of claim 1 wherein the air actuated circuit comprises a photo-sensor.

12. The air actuated system of claim 1 wherein the electrically powered device is a Light Emitting Diode (L.E.D.).

13. The air actuated system of claim 1 wherein the electrically powered device is an incandescent light bulb.

14. The air actuated system of claim 1 wherein the electrically powered device is a toy motor.

15. An air actuated decoration system for coupling with a portion of an automobile to provide decoration comprising;
   a body having an air actuated circuit comprising at least one air actuated switch coupled to the air activated circuit;
   at least one fastening means adapted to attach to a portion of the body with a portion of an automobile; and
   at least one electrically powered device coupled to the air actuated circuit, whereby electricity is provided to the electrically powered device from the air actuated circuit when the air actuated switch is activated by passing air as the automobile is traveling between two locations.

16. The air actuated decoration system of claim 15 wherein the air actuated switch comprises a flap that travels across a gap to couple a first plate with a second plate allowing power to be supplied from the air activated circuit to the electrically powered device.

17. An air actuated decoration device for coupling with a portion of an automobile window to provide decoration comprising;
   a body having an air actuated circuit coupled to at least one air actuated switch, a photo-sensor, and at least one power source, whereby the fastening means is a member that is integrally formed within the body and adapted to removably attached to a top portion of an automobile window;
   a semi-hollow flute coupled to the top portion of the body;
   at least one incandescent light bulb coupled to the air actuated circuit that is powered by at least one battery when the air actuated switch is activated by passing air as the automobile is traveling between two locations; and
   a generally hollow ornament that is adapted to removably attach to the top portion of the flute.

18. The air actuated decoration device of claim 17 wherein the body has streamers removably attached.

19. The air actuated decoration device of claim 17 wherein the ornament has streamers removably attached.

* * * * *